United States Patent
Chao et al.

(10) Patent No.: US 6,849,810 B2
(45) Date of Patent: Feb. 1, 2005

(54) ANTENNA LOOP STRUCTURE

(75) Inventors: Ching-Chuan Chao, Sang Chung (TW); Chih-An Chen, Taipei (TW)

(73) Assignee: AIPTEK International Inc., Hsinchu (TW)

(*) Notice: Subject to any disclaimer, the term of this patent is extended or adjusted under 35 U.S.C. 154(b) by 283 days.

(21) Appl. No.: 09/866,113

(22) Filed: May 25, 2001

(65) Prior Publication Data

US 2003/0001824 A1 Jan. 2, 2003

(51) Int. Cl.[7] ............................. G09G 5/00; G06K 11/06
(52) U.S. Cl. ............................. 178/18.03; 178/18.01; 178/18.02; 345/174
(58) Field of Search ..................... 178/18.01, 18.02, 178/18.03; 345/173, 174, 177; 343/721, 726, 727–728, 732, 788, 801, 842; 455/107, 274

(56) References Cited

U.S. PATENT DOCUMENTS

| | | | | |
|---|---|---|---|---|
| 5,134,689 A | * | 7/1992 | Murakami et al. | 345/177 |
| 5,661,269 A | * | 8/1997 | Fukuzaki et al. | 178/18.03 |
| 6,118,084 A | * | 9/2000 | Landmeier | 178/18.01 |
| 6,184,864 B1 | * | 2/2001 | Chao et al. | 345/157 |
| 6,476,799 B1 | * | 11/2002 | Lee et al. | 345/174 |
| 6,606,087 B1 | * | 8/2003 | Tomomatsu | 345/174 |
| 2002/0053474 A1 | * | 5/2002 | Chao et al. | 178/18.03 |
| 2003/0001824 A1 | * | 1/2003 | Chao et al. | 345/173 |
| 2003/0010544 A1 | * | 1/2003 | Chao et al. | 178/18.01 |

* cited by examiner

Primary Examiner—Bipin Shalwala
Assistant Examiner—David L Lewis

(57) ABSTRACT

An antenna loop structure applicable to a digitizer tablet is capable of reducing effect of electromagnetic interference (EMI) by aggregating a plurality of antenna loops, wherein each antenna loop further comprises a plurality of ⊓-shaped segmental antennas, and each pair of immediate neighboring segmental antennas is phase-inverted to each other for counteracting against external EMI.

7 Claims, 3 Drawing Sheets

ANTENNA LOOP STRUCTURE

FIELD OF THE INVENTION

This invention relates generally to antenna loops, more particularly, it relates to an antenna loop structure comprising a plurality of ⊓-shaped segmental antennas, wherein two immediate neighboring segmental antennas are phase-inverted to counteract each other for eliminating effect of external electromagnetic interference (EMI).

BACKGROUND OF THE INVENTION

A wireless digitizer tablet is basically a circuit board composed of equidistance-spaced antenna loops aligned in a lattice array based on X-Y coordinates. The digitizer tablet is designed to receive electromagnetic waves emitted from a wireless stylus and calculate the absolute coordinates of the wireless stylus. As illustrated in a schematic distribution chart of the antenna loop in a conventional digitizer tablet (in X-axis only) shown in FIG. 1, one end of every antenna loop 10 is connected with a switch 11 while the other end is grounded, wherein the ON/OFF operation of the switch 11 is controlled for detection of a signal induced in each antenna loop 10.

As it is well known however that the magnetic intensity is in inverse proportion to square of distance, hence, the farther the wireless stylus leaves from the antenna loop, the weaker is the signal to be received by the latter and vice versa. Basing on this relationship between the magnetic intensity and the distance, the coordinates of the wireless stylus may be calculated to thereby obtain the exact location of the stylus by analyzing the signal received by each antenna loop after a sequential scanning of all the antenna loops is made by a microprocessor in the digitizer tablet.

In today's high-speed data transmission environments, electromagnetic interference (EMI) has become extraordinarily conspicuous and more serious. For example, under a large scale digitizer tablet, a good number of antenna loops is buried, and for reducing the quantity of the antenna switch, the ⊓-shaped antenna loops in relatively longer length are adopted which are more liable to be interfered by EMI, particularly by the EM waves radiated from some computer peripherals, especially the monitor.

Therefore, it is until now a very important issue: "How can people do better to eliminate more efficiently the external EMI of a digitizer tablet?"

SUMMARY OF THE INVENTION

The primary object of this invention is to provide an antenna loop structure capable of reducing EMI by aggregating a plurality of antenna loops, wherein each antenna loop further comprises a plurality of ⊓-shaped segmental antennas, and every two immediate neighboring segmental antennas are phase-inverted to each other for counteracting against external EMI.

For more detailed information regarding advantages or features of this invention, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE INVENTION

Figure 1:
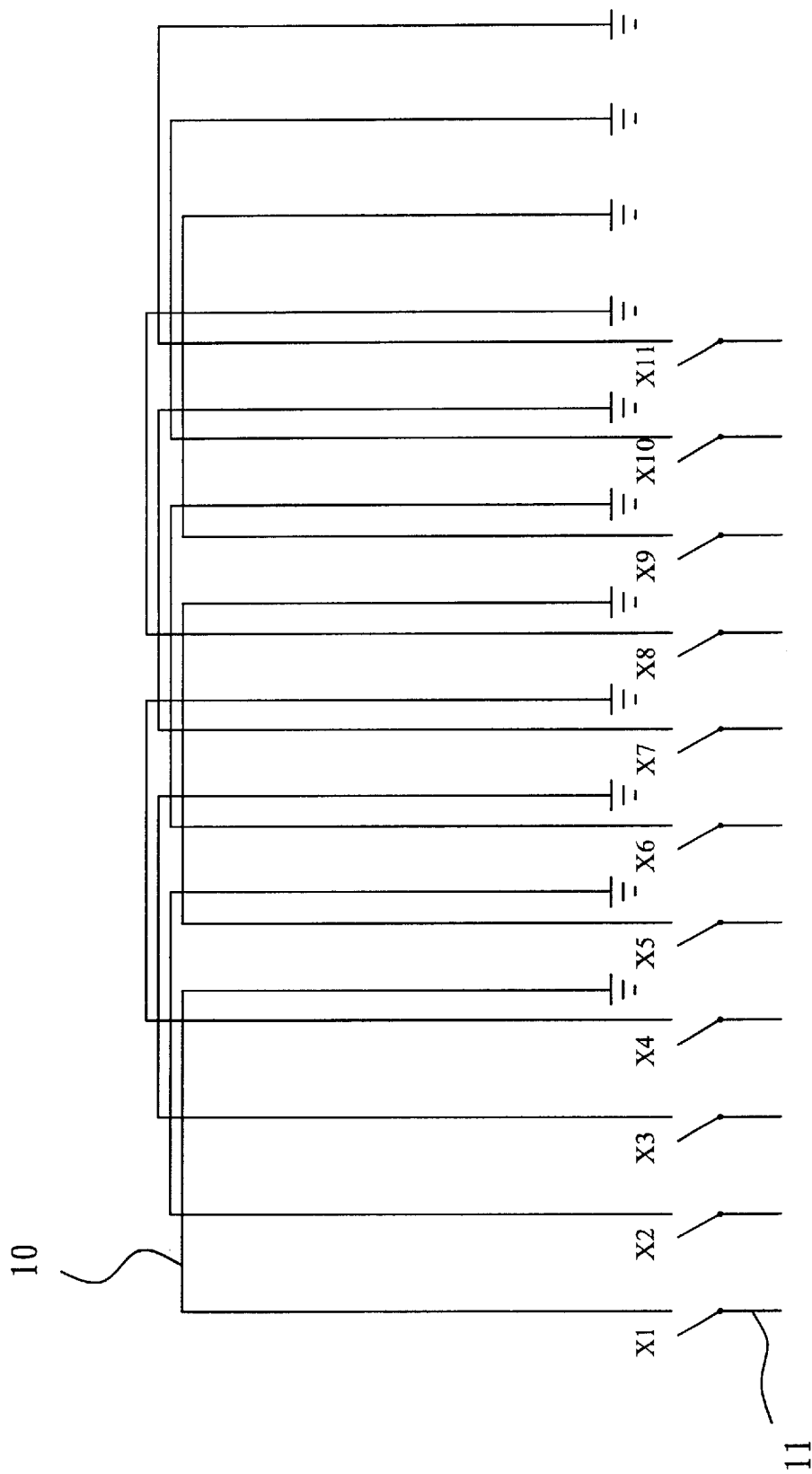
FIG. 1 is a schematic view of an antenna loop of a conventional digitizer tablet.
Figure 2:
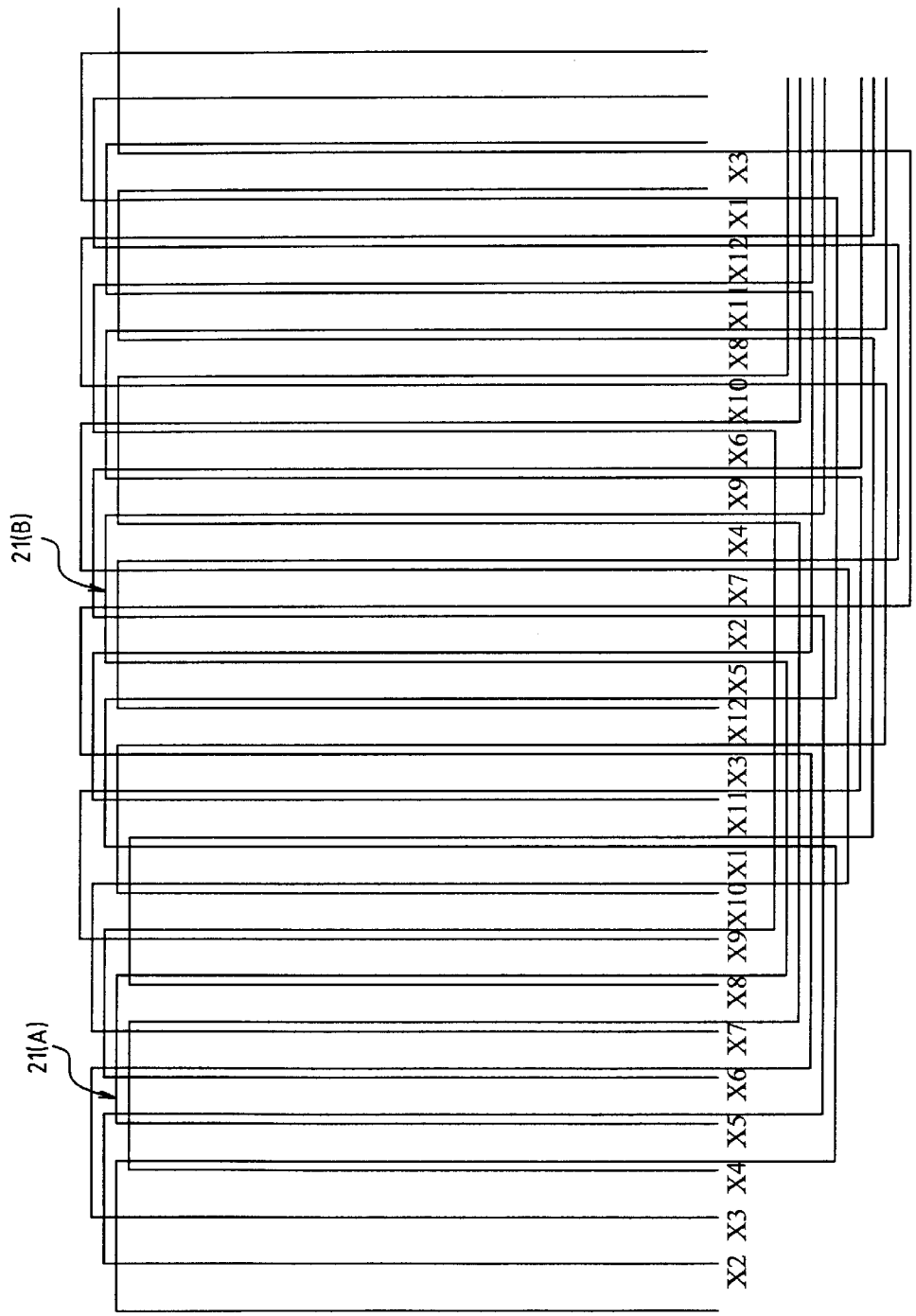
FIG. 2 is a schematic view of an antenna loop of this invention formed by a plurality of ⊓-shaped segmental antennas.

An antenna loop structure is usually composed of a plurality of ⊓-shaped segmental antennas, and the antenna loop structure of this invention shown in FIG. 2 comprises 12 sets of antenna loops from a loop X1 all the way up to a loop X12, wherein each antenna loop further comprises a plurality of ⊓-shaped segmental antennas 21 and any pair of immediate neighboring ⊓-shaped segmental antennas belongs to two different antenna loops respectively. For example, two ⊓-shaped segmental antennas 21 (A, B) are enclosed by antenna loop X4, X6 and X12, X2 individually, so that when a stylus is found located at the position (A) of the antenna loop X5, it can be identified by examining its neighboring segmental antennas.

Figure 3:
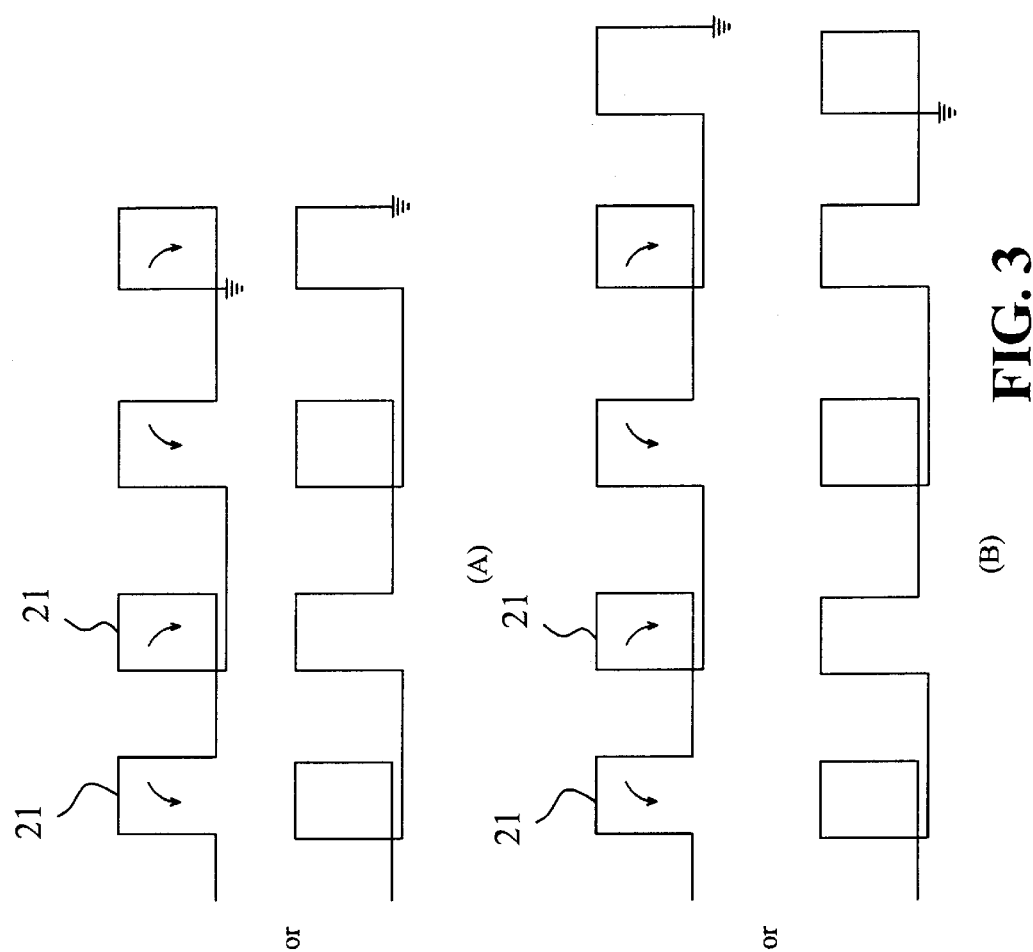
FIG. 3 is a schematic view showing the antenna loop of this invention, which takes advantage of each pair of immediate neighboring phase-converted segmental antennas for counteracting against external EMI.

Regarding the technology of this invention for eliminating electromagnetic interference (EMI) as illustrated in FIG. 3, as every two immediate neighboring ⊓-shaped segmental antennas are phase-inverted to each other so that when noise of EMI is incurred in the antenna loop structure of this invention, two voltages equal in magnitude but opposite in polarity are induced in every two immediate neighboring segmental antennas to therefore counteract each other and eliminate the noise. FIG. 3(A) indicates that every antenna loop is composed of a plurality of ⊓-shaped segmental antennas in an even number while that of FIG. 3(B) in an odd number.

In short, by taking advantage of the paired ⊓-shaped segmental antennas that will create opposite voltages to counteract each other in every antenna loop, a whatever large scale digitizer tablet will become immune from EMI noise to some extent.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. An antenna loop structure comprising a plurality of antenna loops each having a plurality of ⊓-shaped segmental antennas, wherein said plurality of antenna loops are arranged in a lattice array in such a way that a first ⊓-shaped segmental antenna of a given antenna loop has two immediate neighboring antenna loops that are different from the two immediate neighboring antenna loops of a second ⊓-shaped segmental antenna of the given antenna loop.

2. The antenna loop structure claimed in claim 1, wherein every two adjacent ⊓-shaped segmental antennas in a same antenna loop are phase inverted to each other for eliminating electromagnetic interference.

3. The antenna loop structure as claimed in claim 1, wherein each antenna loop has an odd number of ⊓-shaped segmental antennas.

4. The antenna loop structure as claimed in claim 1, wherein each antenna loop has an even number of ⊓-shaped segmental antennas.

5. An antenna loop structure comprising a plurality of antenna loops each having a plurality or ⊓-shaped segmental antennas, wherein every two adjacent ⊓-shaped segmental antennas in a same antenna loop are phase inverted to each other for eliminating electromagnetic interference.

6. The antenna loop structure as claimed in claim 5, wherein each antenna loop has an odd number of ⊓-shaped segmental antennas.

7. The antenna loop structure as claimed in claim 5, wherein each antenna loop has an even number of ⊓-shaped segmental antennas.

* * * * *